(12) United States Patent
Williams

(10) Patent No.: US 12,741,528 B2
(45) Date of Patent: Sep. 22, 2026

(54) CAPACITOR-BASED ON-WHEEL ENERGY STORAGE FOR A WHEEL MOTOR

(71) Applicant: Kevin R. Williams, Waller, TX (US)

(72) Inventor: Kevin R. Williams, Waller, TX (US)

(*) Notice: Subject to any disclaimer, the term of this patent is extended or adjusted under 35 U.S.C. 154(b) by 464 days.

(21) Appl. No.: 18/484,035

(22) Filed: Oct. 10, 2023

(65) Prior Publication Data

US 2025/0115115 A1 Apr. 10, 2025

(51) Int. Cl.
*B60K 7/00* (2006.01)
*H02K 11/00* (2016.01)
*H02K 11/20* (2016.01)

(52) U.S. Cl.
CPC ........ *B60K 7/0007* (2013.01); *H02K 11/0094* (2013.01); *H02K 11/20* (2016.01)

(58) Field of Classification Search
CPC ... B60K 7/0007; H02K 11/20; H02K 11/0094
USPC ........................................................ 180/65.51
See application file for complete search history.

(56) References Cited

U.S. PATENT DOCUMENTS 5,767,595 A 6/1998 Rosen
6,819,012 B1 11/2004 Gabrys
6,876,100 B2 * 4/2005 Yumita .................... F03B 13/00 290/43
7,552,787 B1 6/2009 Williams
9,702,349 B2 * 7/2017 Anderson ............ B60G 17/019
9,862,264 B2 1/2018 Lampic
10,493,990 B2 * 12/2019 Dhaens ................. B60W 10/22
10,960,723 B1 * 3/2021 Hall ...................... F16F 15/005
2010/0101879 A1 * 4/2010 McVickers ............... B60T 1/10 310/156.43
2015/0381003 A1 * 12/2015 Rajasingham ......... H02K 21/24 310/68 R
2016/0068054 A1 3/2016 Abe
2021/0281149 A1 * 9/2021 Islam .................. G01D 11/245

FOREIGN PATENT DOCUMENTS

| | | | |
|---|---|---|---|
| EP | 2 658 096 | A2 | 4/2022 |
| ES | 2268349 | T3 | 3/2007 |
| GB | 2476665 | A | 7/2011 |

* cited by examiner

*Primary Examiner* — Hau V Phan
(74) *Attorney, Agent, or Firm* — Egbert, McDaniel & Swartz, PLLC

(57) ABSTRACT

A wheel assembly for a vehicle has a rotor housing having a support structure with permanent magnets therein, a stator housing having windings therein, and an energy storage module affixed to the support structure of the stator housing. The energy storage module has a plurality of capacitor banks therein. The plurality of capacitor banks have a plurality of switches therebetween. The energy storage module is enclosed within a housing. The plurality of capacitor banks are switchably connected together such that at least some of the plurality of capacitor banks are in series as charge builds and voltage rises and in parallel as charge depletes and voltage drops.

12 Claims, 6 Drawing Sheets

CAPACITOR-BASED ON-WHEEL ENERGY STORAGE FOR A WHEEL MOTOR

CROSS-REFERENCE TO RELATED APPLICATIONS

Not applicable.

BACKGROUND OF THE INVENTION

1. Field of the Invention

The present invention relates to wheel motors. More particularly, the present invention relates to energy storage for such wheel motors. In particular, the present invention relates to energy storage for wheel motors in which the energy storage is carried by the wheel.

2. Description of Related Art Including Information Disclosed Under 37 CFR 1.97 and 37 CFR 1.98

As the price of fossil fuel rises and more and more people are utilizing personal vehicles as a means for transportation, the demand for fuel continues to increase. The population of the world is increasing, but just as importantly, the general population of many countries, which historically did not have personal engine-driven vehicles, is on the rise. There is also more and more demand for hybrid-electric vehicles, fuel cells, and electric means for transportation. These are designed for the most efficient means of converting energy to propulsion with the least amount of energy consumed.

In the conservation of energy, losses during the braking action of a motorized vehicle can be stored and reused during the acceleration of the vehicle. The efficiency of energy consumption for propulsion is increased and less energy is used because of capturing and reusing the energy that is normally burned as excess heat in the vehicle's braking system. There are many proven technologies which utilize this method of energy recovery. These technologies date back twenty or thirty years and are utilized on many hybrid electric vehicles.

A major problem with existing hybrid electric vehicles is the fact that the entire vehicle must be purchased in order to obtain the benefits of the electric propulsion. There have been, in the past, systems wherein the internal combustion engine can be retrofitted or converted into a hybrid vehicle. The ease of conversion is very important so as to facilitate the conservation and use of energy. With the tightening of federal emissions regulations combined with public concern over transportation-related pollution, the market for electric vehicles is growing. However, even with increased production, electric vehicles remain more expensive than comparably-performing fossil-fueled vehicles. As such, there has been a need for a low-cost retrofit for fossil-fueled cars and trucks that provides performance improvement during start-and-go-stop traffic (<40 miles per hour) so as to reduce fuel use and emissions. There is also a need for secondary action to assist with power boost at highway speed. It is important to be able to retrofit such vehicles including off-road vehicles, along with both personal and commercial vehicles. Also, there is a need to be able to retrofit conventional bicycles so as to provide electric bicycles at lower cost.

In the past, a variety of in-wheel motors have been provided in the prior art. For example, U.S. Pat. No. 7,552,787, issued on Jun. 30, 2009 to K. R. Williams, describes an energy-recoverable wheel motor for attachment to an axle. This energy-recoverable wheel motor has a motor mount plate suitable for attachment to the axle, a rim defining an outward periphery of the wheel, a flywheel mounted interior of the rim and freely rotatable relative to the motor mount plate, a first rotor motor affixed to an interior surface of the flywheel so as to rotate with a rotation of the flywheel, and a second stator motor fixedly positioned relative to the first rotor motor. A second stator motor is affixed to the motor mount plate. A stator motor is fixedly positioned relative to the second stator motor. The first stator motor is affixed to one side of the vehicle mounting plate. The second rotor motor is affixed to an opposite side of the vehicle mounting plate.

European Patent No. 2 658 096, published on Apr. 27, 2022 to M. Broughtwood, describes an electric motor or generator for mounting in a wheel of a road vehicle. This electric motor or generator has a stator having a plurality of coils, a rotor having a radial wall and a circumferential wall in which a plurality of magnets are mounted on the inside of the circumferential wall surrounding the coils of the stator, a bearing block having a first part affixed to the stator and a second part affixed to the rotor. The radial wall of the stator has a central portion for mounting to a vehicle on one side and for connection to the first part of the bearing block. The radial wall of the rotor has a central portion for mounting a wheel on the outside of the rotor and to the second part of the bearing block on the inside of the rotor. The wheel is mountable to the motor at the central portion of the radial wall of the rotor for connection to a vehicle by the bearing block. The outside of the circumferential wall of the rotor has no load-bearing portions.

U.S. Pat. No. 9,862,264, issued on Jan. 9, 2018 to Lampic et al., shows an in-wheel electric motor. This in-wheel electric motor comprises at least one stator, a rotor plate, a rotor tube, a bearing system, and a brake system arrange such that the rotor plate is attached to the rotor tube and to the bearing system. The opening of the rotor tube and stator is on at least one axial side larger than the largest braking system or bearing system part. The brake system and bearing system parts, along with the attachment points, are accessible when the rotor plate and outer parts of the brake system, bearing system and the rim are removed. The rim is a separate part of the rotor plate and rotor tube. The rotor plate attachment to the bearing system is in parallel to the rim attachment. On one of the flanges, there is an edge with its height smaller than the smallest radial cranny between the rotor tube and the stator.

U.S. Patent Application Publication No. 2016/0068054, published a Mar. 10, 2016 to Abe et al., teaches an in-wheel motor unit for a vehicle. This in-wheel motor unit has a drive output shaft of a drive unit body and a wheel hub shaft supported by a hub bearing with respect to a case member of the drive unit body. These are connected via a displacement absorption mechanism. The displacement absorption mechanism comprises an output shaft side drive transmission fitting portion allowing a first inner tooth portion of the drive output shaft to mesh with a first outer tooth portion of a gear coupling shaft, and a hub shaft side drive transmission fitting portion allowing a second inner tooth portion of the hub wheel shaft to mesh with a second outer tooth portion of the gear coupling shaft. The second outer tooth portion is arranged axially in the vehicle exterior side with respect to a wheel mounting surface on which a tire wheel is mounted to the wheel hub.

U.S. Pat. No. 6,819,012, issued on Nov. 16, 2004 to C. W. Gabrys, describes a flywheel energy storage system which has an energy storage flywheel supported in a low-pressure containment vessel for rotation on a bearing system. A brushless motor/generator is coupled to the flywheel for accelerating and decelerating the flywheel in order to store and retrieve energy. The flywheel is rotated in normal operation at a speed such that the generator voltage is higher than the output voltage. The power supply of the flywheel efficiently maintains power to an electrical load during an interruption of primary power by supplying power generated from the flywheel's generator.

U.S. Pat. No. 5,767,595, issued on Jun. 16, 1998 to H. A. Rosen, provides a flywheel support system that isolates the flywheel and its motor-generator from the driving environment of an electrically-powered motor vehicle. During normal operation, a mechanical gimbal system keeps the vacuum housing centered in the outer housing, reacts the spin moments generated by the motor-generator, and provides a passage for the electrical leads into the vacuum housing. A suitable liquid is placed between the outer and vacuum housings of the flywheel assembly to provide buoyancy and damping to the vacuum housing, cooling the motor-generator, and serving as one of the barriers to rotor energy and angular momentum transfer in the event of an accident or failure.

The Protean E-class in-wheel motor (see proteanelectric-.com) shows a motor that can significantly improve fuel economy in hybrid configurations when compared with existing vehicles. The drive system has superior regenerative braking capabilities that allows up to 85% of the available kinetic energy to be recovered during braking.

The YASA in-wheel motor includes both radial gap and axial gap designs. In particular, this is an axial flux permanent magnet machine. The electric motors and controllers provide great efficiency and highest power and torque density for the smallest size and weight. Direct oil cooling helps the motors achieve higher continuous power.

The Nissan in-wheel motor (see Nissan-Global.com) places the motor next to the wheel and is not integrated into the wheel. By using separate front and rear electric motors, the powertrain generates 227 kilowatts of maximum output and 680 Nm of maximum torque. This output is complemented by the ultra-high-precision motor control that offers highly responsive, yet smooth, acceleration.

The Elaphe in-wheel motor (see in-wheel.com) is a compact in-wheel motor with an integrated standard disc brake, a standard outer caliper, and a standard hub bearing. It is designed to fit the original vehicle knuckle because of a packaging concept.

The Printed Motor Works in-wheel motor (see https: \\www.printedmotorworks.com/industries/automotive/) allows the car to use regenerative braking and captures over 50% of the kinetic energy by using a bank of supercapacitors in the front of the car to store the electrical power generated.

The Eco-Move in-wheel motor (see https://www.eco-move-emobility.net/about-us) has an in-wheel electric powertrain that is powerful and compact. The entire power train is located within the wheel because of a compact traction motor. Traction and braking using a disc calipers are included.

These prior art in-wheel motors fail to integrate energy storage directly into the wheel assembly. As such, an easy and simple retrofit of the wheel onto the vehicle cannot be achieved. In the past, these power systems require energy storage at a location away from the wheel. As such, complex wiring schemes and control systems are required in order to effectively integrate the energy storage with the wheel motor.

One of the problems associated with the any attempt to integrate energy storage directly into the wheel assembly has been the ability to store significant amounts of power within the small area available in the wheel assembly. Typically, in the past, the energy storage has been located on the vehicle or in an area adjacent to the wheel motor. Under the circumstances, complex wiring schemes have to be developed so as to extend to extend to a battery, or other energy storage, in a remote location away from the wheel. This defeats the ability to be able to completely retrofit the vehicle with a wheel motor having energy storage.

Modern capacitors are of particular value when considering a configuration that is suitable for storing energy associated with the wheel motor. Capacitors have high power densities (W-h/l and W-h/kg) and long cycle lives far exceeding those of chemical batteries. One challenge for applications for the in-wheel motor/generators arises from the capacitor's low voltage rating. The capacitor-based solutions that achieve the needed stored energy fall short of the needed voltage rating. This places a greater demand on the inverter designed to limit voltage. This results in greater inverter volume and weight as cells are placed in series to meet the voltage requirements.

Two principal factors are responsible for driving the voltage higher. The energy storage is proportional to the square of voltage and the DC supply to the inverter must be greater than the operating voltage of the inverter. In the former case, doubling the voltage allows for the storage of four times as much power for a given capacitance. In the latter case, by elevating the motor voltage, the current required by the motor to develop a given torque is proportionately reduced and similarly reduces the size of the inverter.

Nominally, a typical inverter will have a maximum-to-minimum DC voltage rating ratio of roughly 0.5, e.g., 640 to 1250 VDC for a current commonly available 690V class industrial inverter. To fully utilize the capacitor's storage capacity, the capacitor must be fully discharged. This is not practicable in a typical inverter due to the minimum operating voltage requirements. As such, a means to more fully utilize the storage capability of the capacitor bank would be desired.

U.S. Pat. No. 7,681,676, issued on Mar. 23, 2010 to P. H. Kydd, shows an assembly for converting an internal combustion vehicle into an electric-hybrid vehicle. This assembly comprises a battery, a battery charger, a controller, an electric motor, and a power transmission.

International Publication No. 2009067895, published on Jun. 4, 2009, describes a power wheel that includes a wheel, a power-driving device for driving the wheel to rotate, and a power supply for the power-driving device. The power-driving device and the power supply are mounted in the wheel. The power-driving device is an electrical machine. The power supply is a charge battery. The electrical machine connects to the charge battery by connecting wire or conductive slip rings. The power wheel can be applied to an electrical bicycle. The charge battery and the electrical machine are set in the wheel to utilize the space of the wheel.

Spanish Patent No. 2268349, published on Mar. 16, 2007, provides an electrically-driven vehicle that has the engine and power supply contained in the wheels. This electrically-powered vehicle has a first wheel that comprises an axle and a cylindrical stator frame fixed on the shaft such that an internal surface of the stator frame defines a space that accommodates a power supply source. A plurality of electromagnetic stator segments are located on an outer surface of the stator frame such that the stator frame is nonmagnetic. A cylindrical rotor frame is coupled to the shaft by means of bearings such that an internal surface of the rotor frame supports a plurality of permanent magnets distributed such that they surround the stator segments to form a radial air gap between them. A tire is mounted on an external surface of the rotor frame. The outer circumference of the space contained in the cylindrical stator frame houses the power supply source that is limited by the internal surface of the stator frame.

British Patent Application No. 2476665, published on Jul. 6, 2011, shows a regenerative braking system that can be quickly and easily fit into existing vehicles. This regenerative braking system has a flywheel mounted on a wheel of the vehicle or its hub for rotation relative to the wheel. The apparatus has sensors for sensing a parameter indicative of an angular speed and direction of the flywheel relative to the wheel. A sensor senses a parameter indicative of a speed and rate of change of speed of the vehicle. A clutch or an electric motor/generator are controlled by a controller so as to produce a torque between the flywheel and the wheel to increase or reduce the relative angular speed of the flywheel and the wheel.

It is an object of the present invention to provide an energy storage module for a wheel motor which reduces the size of the required inverter.

It is another object of the present invention to provide an energy storage module for a wheel motor that reduces the current required by the motor.

It is another object of the present invention to provide an energy storage module for the wheel motor which more fully utilizes the charge capability of the capacitors.

It is another object of the present invention to provide an energy storage module for wheel motors in which energy storage is integrated directly into the wheel housing.

It is another object of the present invention to provide an energy storage module for a wheel motor in which can be retrofitted to existing wheel stations of internal combustion engine-powered vehicles.

It is another object of the present invention to provide a wheel motor that can be easily installed using conventional tools.

It is another object of the present invention to provide a wheel motor assembly that provides acceleration boosts and deceleration energy recovery.

It is another object of the present invention to provide a wheel motor with energy storage that offers fuel use reduction.

It is another object of the present invention to provide a wheel motor with energy storage that effectively reduces emissions.

It is still another object of the present invention to provide a wheel motor with energy storage that has a relatively low cost.

It is still another object of the present invention to provide an a wheel motor with energy storage that is adaptable to a wide variety of vehicles.

It is still a further object of the present invention to provide a wheel motor with energy storage that requires no alterations in the engine, transmission, computer control module or brake system of the vehicle.

It is an object to the present invention to provide a wheel motor in which energy storage is integrated into the wheel housing.

It is another object of the present invention to provide a wheel motor that can be retrofitted to existing wheel stations of internal combustion engines.

It is still a further object of the present invention that effectively provides a small package for energy storage as a result of the adaptive switching.

These and other objects and advantages of the present invention will become apparent from a reading of the attached specification and appended claims.

BRIEF SUMMARY OF THE INVENTION

The present invention is a wheel assembly for a vehicle that comprises a rotor housing having a support structure, a stator housing having windings therein, and an energy storage module affixed to the support structure of the stator housing. The rotor housing has permanent magnets therein. The rotor housing is adapted to rotate relative to a rotation of the wheel. The stator housing is rotatable relative to the rotation of the rotor housing. The windings of the stator housing and the permanent magnets of the rotor housing defining an air gap therebetween. The energy storage module is cooperative with the windings of the stator housing and with the permanent magnets of the rotor housing so as to receive and transmit energy from and to the windings relative to the motion of the vehicle. The energy storage module has a plurality of capacitor banks therein. The plurality of capacitor banks has switches therebetween.

In particular, the energy storage module has a housing affixed to the support structure of the stator housing. The plurality of capacitor banks are positioned in the housing of the energy storage module.

The plurality of capacitor banks are switchably connected together such that at least some of the plurality capacitor banks are in parallel as charge builds and voltage rises in the energy storage module. The plurality of capacitor banks are switchably connected together such that at least some of the plurality of capacitor banks are in series as charge is depleted and voltage drops in the energy storage module.

In a specific embodiment of the present invention, the plurality of capacitor banks comprise a first capacitor bank, a second capacitor bank, a first switch and a second switch extending in parallel between the first capacitor bank and the second capacitor bank, a third capacitor bank, a fourth capacitor bank, a third switch and a four switch extending in parallel between the third capacitor bank and the fourth capacitor bank, a fifth switch extending between the first capacitor bank and the third capacitor bank, a sixth switch extending between the second capacitor bank and the fourth capacitor bank, a seventh switch extending between the first switch and the second switch, an eighth switch extending between the third switch and the fourth switch, and a ninth switch extending between the fifth switch and the sixth switch. The first, second, third, fourth, fifth and sixth switches are closed and the seventh, eighth and ninth switches are open as the charge builds and the voltage rises. The fifth switch and the sixth switch are open and the ninth switch is closed as the charge starts to deplete and voltage falls such that the second capacitor bank and the third capacitor bank are in series and the first capacitor bank and the fourth capacitor bank are in parallel. The first, second, third and fourth switches are open and the seventh, eighth and ninth switches are closed such that the plurality of capacitor banks are in series as charge continues to deplete and voltage continues to fall.

Control electronics are affixed to the stator housing and connected to the energy storage module. The control electronics are adapted to control the switches in the energy storage module. Each of these capacitor banks has a plurality of energy storage elements therein. The energy storage elements are selected from the group consisting of capacitors, ultra-capacitors, chemical batteries, solid-state batteries and combinations thereof. The energy storage module has at least one inverter therein. The inverter is adapted to switch the DC power from the plurality of capacitor banks into voltages for propulsion of the wheel motor.

In a preferred embodiment of the present invention, the air gap extends concentric to an axis of rotation of the wheel hub. The rotor housing is adapted to be affixed to a non-rotatable portion of the vehicle.

The present invention is also an energy storage module for use with a wheel motor. This energy storage module comprises a housing adapted to be affixed to the wheel motor, a plurality of capacitor banks positioned in the housing, a plurality of switches connected between the plurality of capacitor banks so as to switchably transition the plurality of capacitor banks between a parallel configuration and a series configuration, and a propulsion inverter connected to the plurality of capacitor banks and adapted to pass energy for operation of the wheel motor. The parallel configuration is when the plurality of capacitor banks are highly charged. The series configuration is when the plurality of capacitor banks are depleted.

In a preferred embodiment of this energy storage module, the plurality of capacitor banks includes a first capacitor bank, a second capacitor bank, a first switch and a second switch extending in parallel between the first capacitor bank and the second capacitor bank, a third capacitor bank, a fourth capacitor bank, a third switch and a four switch extending in parallel between the third capacitor bank and the fourth capacitor bank, a fifth switch extending between the first capacitor bank and the third capacitor bank, a sixth switch extending between the second capacitor bank and the fourth capacitor bank, a seventh switch extending between the first switch and the second switch, an eighth switch extending between the third switch and the fourth switch, and a ninth switch extending between the fifth switch and the sixth switch. As the first, second, third, fourth, fifth and sixth switches are closed and the seventh, eighth and ninth switches are open, the charge builds and the voltage rises. When the fifth and sixth switches are open and the ninth switch is closed, charge starts to deplete and voltage falls such that the second capacitor bank and the third capacitor bank are in series and the first capacitor bank and the fourth capacitor bank are in parallel. When the first, second, third and fourth switches are open and the seventh, eighth and ninth switches are closed, the plurality of capacitor banks are in series as charge continues to deplete and voltage continues to fall.

Control electronics are affixed to the wheel motor and connected to the plurality of switches so as to control the switches in the energy storage module. Each capacitor bank of the plurality of capacitor banks has a plurality of energy storage elements therein. These energy storage elements are selected from the group consisting of capacitors, ultra-capacitors, chemical batteries, solid-state batteries and combinations thereof.

The configuration of the present invention is a novel design that presents fuel savings and emissions reductions similar to those of electric vehicles and is retrofittable to fossil-fueled vehicles. The wheel motor is an in-wheel motor design. The energy storage module is an on-wheel design. Unlike in-wheel motors available commercially today, the present invention integrates the energy storage system directly into the assembly on the wheel. This offers the benefit of regenerative energy braking without the added cost of larger, more expensive batteries typically found on electric vehicles. In particular, the present invention avoids the use of large inverters that would typically be necessary for storing large amounts of electricity during energy storage.

The retrofitting of a fossil-fueled vehicle with the wheel motor of the present invention results in a 57% reduction in fuel use and emissions output for stop-and-go traffic typically up to 40 miles per hour. This technology also provides acceleration boosts an energy recovery during deceleration of higher velocity driving cycles, such as fifty miles per hour to sixty-five miles per hour or sixty miles per hour to seventy miles per hour.

The intended market is for a low-cost retrofit for fossil-fueled cars and trucks. The present invention is focused on performance improvement during start-and-go traffic while reducing fuel use and emissions. A secondary action of the present invention is to assist with power boost at highway speed. The wheel motor of the present invention is also applicable to off-road vehicles, both personal and commercial. These off-road vehicles can include mining vehicles, logging vehicles, and site-restricted markets, such as intermodal operations. The present invention is also applicable as a retrofit to conventional bicycles so as to produce electrical bicycles at lower costs.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
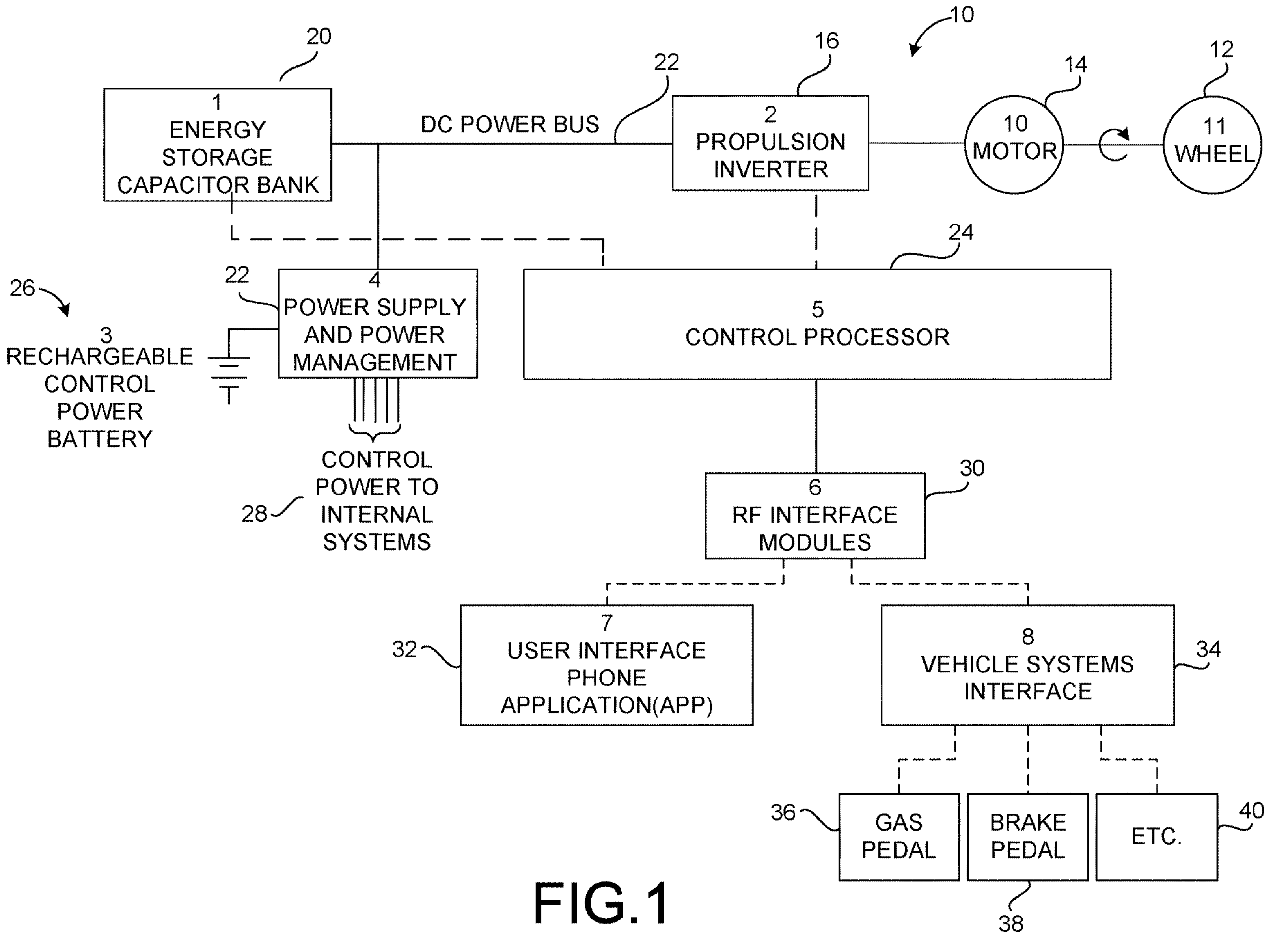
FIG. 1 is a block diagram showing the system architecture associated with the radial gap wheel motor system supported on auxiliary bearings in a parallel arrangement of the present invention.

Referring to FIG. 1, Referring to FIG. 1, there is shown the electrical system topology 10 associated with the wheel motor of the present invention. In particular, this electrical system topology shows a wheel 12 that is driven by a motor 14. As will be described hereinafter motor 14 will be part of wheel 12 and will cause the permanent magnets and windings to cooperate with each other for the driving of the wheel 12 or for the regenerative braking of the wheel 12. A propulsion inverter 16 switches the DC power from the energy storage capacitor bank 20 into voltages required by the motor 14. This inverter 16 can take any form such as a common 6H, isolated windings with 2H bridges, matrix converters, etc. A DC power bus 22 extends between the energy storage capacitor bank 20 and the propulsion inverter 16. The motor 14 can be any type of electric motor, such as an AC motor, DC motor, and induction motor, and a permanent magnet motor (including neither axial gap or radial gap arrangements).

The energy storage capacitor bank 20 stores energy during braking and supplies energy during acceleration. The energy storage bank 20 can be any type of capacitor, ultra-capacitor, chemical batteries, solid-state batteries, or combinations of capacitors and chemical batteries.

An internal power supply 22 utilizes energy stored or being generated or supplies electrical power to the control circuitry associated with the control processor 24. An internal battery 26 can be charged from the internal power supply 22. This battery 26 supplies power when the vehicle is not able to recharge the energy storage capacitor bank 20, such as following a cold start. The power supply 22 can also, in an alternative embodiment, deliver power to internal systems 28.

The control processor 24 contains control logic. The electronics contained in the control processor 24 generate gating signals for the inverter 16 and internal switching based on inputs from internal sensors, remote controls user configuration, etc. The control processor 24 can also be connected, optionally, with a radio frequency interface module 30. Radio frequency interface module can be configured so as to allow monitoring signals from the wheel 12, the motor 14 and the energy storage capacitor bank 20 to be monitored at user interface phone application 32. Alternatively or furthermore, the radio frequency interface module 30 can transmit signals to a vehicle systems interface 34 for cooperation with gas pedal 36, brake pedal 38, and other systems within the vehicle 40.

As shown in FIG. 1, there are various electrical lines connecting the various components. Importantly, the propulsion inverter 16, the energy storage capacitor bank 20 and the control processor 24 can be mounted onto the wheel 12. As such, all of the operational components for the system of the present invention are confined to the wheel structure. As a result, it is not necessary to extend lines throughout the vehicle. All that is necessary is to replace the existing wheel and tire with the present wheel motor 10.

Figure 2:
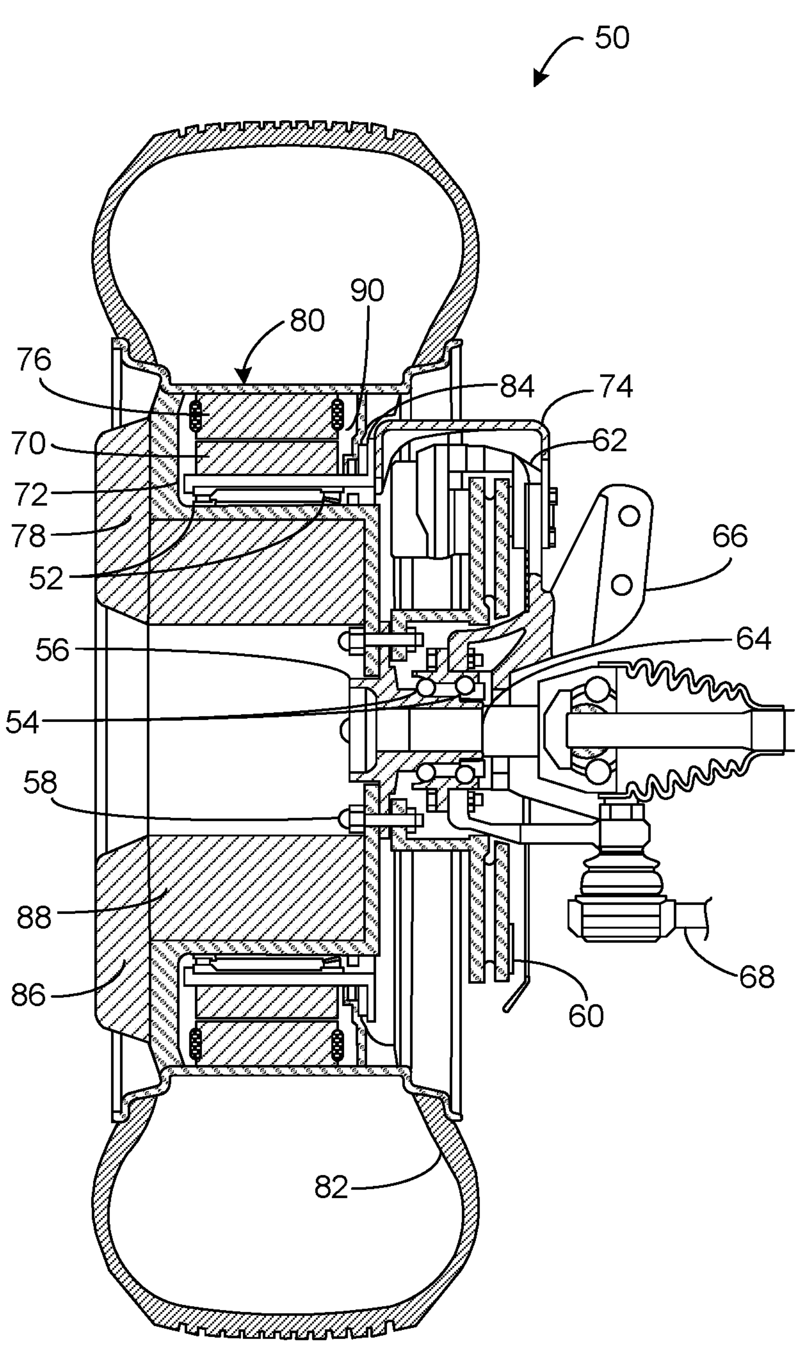
FIG. 2 is a cross-sectional view showing the wheel motor in accordance with the teachings of the preferred embodiment of the present invention.

FIG. 2 shows a cross-section of the radial gap wheel motor 50 that is supported on auxiliary bearings 52 in a parallel arrangement. In the construction of the present invention, there are two distinctive mechanical topologies for the wheel motor 50. FIG. 2 shows a parallel arrangement topology (as opposed to a series arrangement topology). The difference between the parallel arrangement topology and a series arrangement topology are differentiated by how the torque output of the wheel motor 50 is resolved. The parallel approach, as shown in FIG. 2, resolves torque through a structural link which is attached to a non-rotating portion of the vehicle. The parallel arrangement shown in FIG. 2 is configured so as to include both the hub bearings 54 of the vehicle and a set of added auxiliary bearings 52. The arrangement of the wheel motor 50, as shown in FIG. 2, is usable for both steered and non-steered vehicles and for both driven and non-driven wheel stations.

FIG. 2 specifically shows a conventional wheel hub 56, wheel bearings 54, wheel bolts and lugs 58, brake rotor 60 and brake caliper 62. The wheel shaft 64 is attached to the driven stub shaft of the vehicle. The driven stub shaft would not be required for a non-driven configuration. These components are typical manufacturer's products included with the original vehicle. To the extent that the wheel motor 50 of the present invention is associated with a steered wheel, FIG. 2 shows the conventional steering knuckle 66 and steering support joint 68. The steering-related components are also unaltered as supplied with the vehicle.

The wheel motor 50, as shown in FIG. 2, has a non-rotating rotor housing 70. This rotor housing 70 is structurally integrated into the motor shaft 72. The motor shaft 72 is attached to a rotor restraint arm 74. As such, the torque generated by the actions of the motor/generator are conveyed to the non-rotating portion of the vehicle (and in particular to the vehicle frame) through the motor shaft 72 and the restraint arm 74. The restraint arm 74 can be bolted to the steering knuckle 66 or could be attached to directly to the non-rotating back of the wheel hub 56. The installation and removal of the wheel motor 50 can be facilitated by a mechanical or electromechanical quick-disconnect associated with the restraint arm 74. The rotor housing 70 has permanent magnets and laminations therein.

The motor shaft 72 is guided in place by the outer race of the auxiliary motor shaft bearings 52. The inner race of the auxiliary motor shaft bearings 52 are tied to the vehicle frame through the wheel hub 56 and the wheel bearings 54.

The stator housing 76 is structurally integrated into a purpose-built inner wheel rim support structure 78. The inner wheel rim support structure 78 is bolted to the wheel hub 56 by conventional wheel bolts and lugs 58. An outer wheel rim 80 is located at the outer periphery of the inner wheel rim support structure 78. The outer wheel rim 80 is shown as having the wheel tire 82 positioned thereon and affixed thereto. The stator housing 76 is a rotating section of the motor/generator of the wheel motor 50 and includes windings and laminations. Motor shaft seals 84 are included so as to protect the motor/generator from debris. Cooling passages can be embedded into the wheel motor 50 for the rejection of heat generated during operation.

FIG. 2 shows that there is an electronics module 86 and an energy storage module 88 that rotate with the stator housing and support structure 76. The electronics module 86 includes sensors, computer controllers, inverters, DC-DC converters, and cooling passages. The energy storage module 88 includes energy storage devices, charge balancing networks, and cooling passages. The energy storage can be capacitors or chemical batteries, or combinations of these. The chemical batteries could also include solid-state batteries. The capacitors can also include ultra-capacitors.

The entire wheel motor 50 is installed as one unit onto the vehicle wheel assembly. The wheel motor 50 is bolted onto the wheel hub 56 by the wheel bolts and lugs 58. The rotor restraint arm 74 is then connected. Removal is the reverse of this procedure.

In this configuration, the wheel motor 50 is installed as a single unit. Installation is completed by attachment of the torque restraint arm 74 to a non-rotating portion of the vehicle. The components are divided between those that rotate and those that are stationary. In the present wheel motor 50, the rotor is stationary and the stator is allowed to rotate. The stationary rotor housing 70 is guided in place by auxiliary bearings 52. These auxiliary bearings 52 are supported by the wheel hub 56 and its bearings 54. The purpose of the auxiliary bearings 52 is to preserve an accurate radial air gap 90 between the stator housing 76 and the rotor housing 70. Air gap 90 is generally concentric to an axis of rotation of the wheel hub 56. The maintenance of the accurate radial air gap between the stator housing 76 and the rotor housing 70 (or between the permanent magnets of the rotor housing 70 and the windings of the stator housing 76) provides optimum electromechanical operation of the wheel motor 50. Since the stationary rotor housing 70 is partially supported by the auxiliary bearings 52, a less robust structural attachment is required to the stationary wheel structure. This makes for a simplified installation and removal of the wheel motor 50.

Importantly, for the energy storage module the present invention, it was necessary to place the energy storage module directly on the wheel motor structure. It was found that capacitors have the ability to provide a significant amount of power in a relatively small space. Given the small confines of the wheel, it is necessary to develop an energy storage module that would store sufficient amounts of energy while having a relatively small footprint within the wheel motor. Capacitors have high power densities and long cycle lives far exceeding those of chemical batteries. A problem with such capacitors is the low voltage rating of the capacitors. The typical capacitor-based solutions that one would expect from the prior art that achieve the needed stored energy will fall short of the required voltage rating. This will place a greater demand on the inverter design to limit voltage. As such, larger inverters would occupy a larger space and have a significant weight when the cells are placed in series in order to meet the voltage requirements.

Two principal factors are responsible for driving the voltage higher. The energy stored is proportional to the square of voltage and the DC supply to the inverter must be greater than the operating voltage of the inverter. In the former case, doubling the voltage allows for the storage of four times as much power for a given capacitance. In the latter case, by elevating the motor voltage, the current required by the motor to develop a given torque is proportionately reduced and similarly reduces the size of the inverter.

Anomaly, a typical inverter will have a maximum-to-minimum DC voltage rating ratio of roughly 0.5, e.g., 640 to 1250 VDC for a current commonly available 690V class industrial inverter. To fully utilize the storage capacity of the capacitor, the capacitor must be fully discharged. A typical inverter is not practicable due to the minimum operating voltage requirements. The present invention offers a means for more fully utilizing the storage capability of the capacitor bank. As such, the present invention provides for the switching of the storage capacitors from a parallel (i.e. low-voltage) configuration to a series (e.g. high-voltage) configuration.

Figure 3:
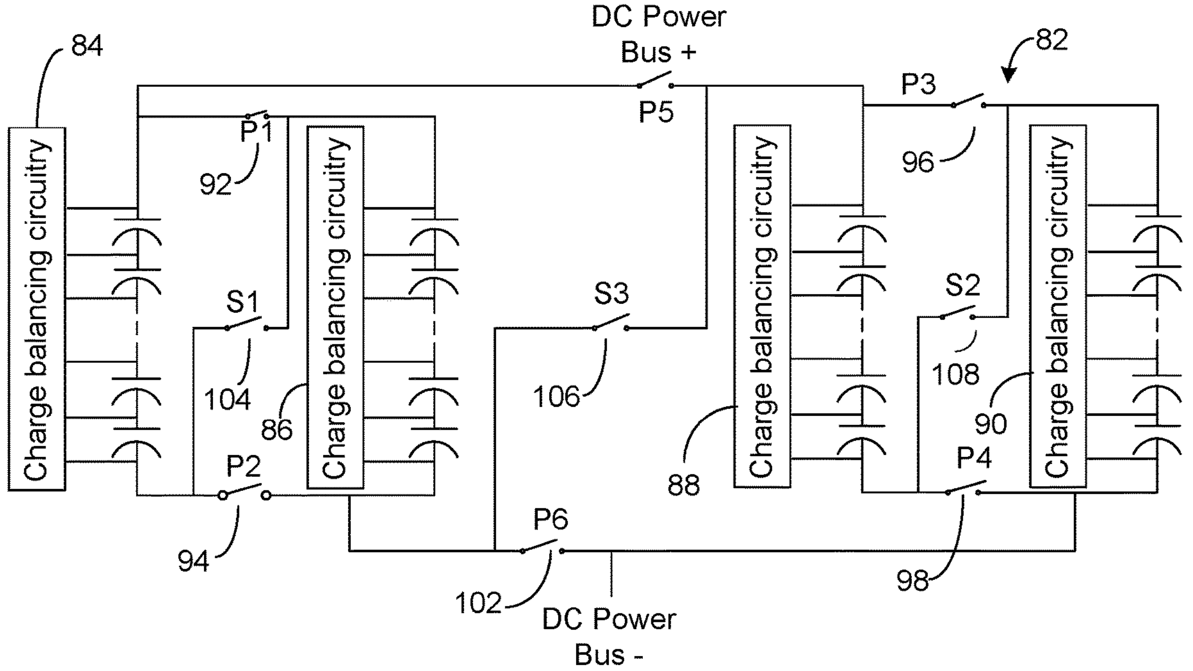
FIG. 3 is an electrical schematic showing the switching devices associated with the capacitors and adaptive voltage control as used in the energy storage module of the present invention.

FIG. 3 shows the novel approach of the present invention in using adaptive switching to change the circuit ordering of the capacitors. The capacitors are divided into banks of convenient size. At high states of charge, the capacitor banks are connected in parallel. As the charge depletes and the voltage falls, the banks are switched into a series configuration, thereby raising the voltage into a useful range again. The reverse is also true. As charge builds and voltage rises, the capacitors are again switched into a parallel configuration, as shown in FIG. 3.

In FIG. 3, it can be seen that the capacitors are divided into capacitor banks 84, 86, 88 and 90. These capacitor banks 84, 86, 88 and 90 are of a convenient size. At high states of charge, the capacitor banks 84, 86, 88 and 90 are connected in parallel. As the charge depletes and voltage falls, the capacitor banks 84, 86, 88 and 90 are switched into series a series configuration so as to raise the voltage to a useful range once again. As charge builds and voltage rises, the capacitor banks 84, 86, 88 and 90 are then switched into a parallel configuration.

Specifically, when the capacitor banks 84, 86, 88 and 90 are in parallel, switches 92, 94, 96, 98, 100 and 102 are closed and switches 104, 106 and 108 are open. This configuration gives the lowest voltage for a given charge level. As charge depletes and voltage falls, the capacitor banks 84, 86, 88 and 90 are switched into a series/parallel configuration by opening switches 100 and 102 and closing switch 106. This places one-half of the capacitor banks in series and one-half of the capacitor banks in parallel so as to double the voltage and allow the inverter to continue to discharge the capacitor banks. Again, as voltage falls, switches 92, 94, 96 and 98 are now open and switches 104, 106 and 108 are closed. This put puts all of the capacitor banks 84, 86, 88 and 90 in series so as to double the voltage and allow the inverter to continue to charge the capacitor banks until 98% of the capacitor energy is recovered.

Multiple switch combinations and topologies are possible. This principle can be reduced to a single series/parallel switching arrangement are extended to more banks for finer voltage control. The system illustrated in FIG. 3 improves the effective storage utilization of the capacitor banks 84, 86, 88 and 90 from 75% to over 98%. Importantly, this allows the package that contains the capacitor banks 84, 86, 88 and 90 to be relatively small and included within the design of the wheel.

It should be noted that the high efficiency of the wheel motor design of the present invention and the part-time duty cycle associated with stop-and-go traffic patterns, heat build-up can be controlled by either passive or active thermal management. For passive control, heat can be dissipated through both conductive paths and convective thermal paths facilitated as a result of the rotation of the wheel. Air coolant passages and large area fins can be integrated so as to assist with heat extraction. Active thermal control can also use sealed heat pipes with a two-phase cooling system optimized for the maximum and minimum temperatures expected to be encountered by the system of the present invention.

A significant amount of analysis has been carried out with respect to the wheel motor of the present invention. It is important that the motor torque be sized to achieve acceleration commensurate with engine-driven performance of conventional combustion engine drives. For sizing the motor torque from the wheel motor of the present invention, a typical SUV passenger vehicle is considered. In particular, this is a four-door, 2019 Ford Edge. The rolling resistance is a maximum of 0.015 over the 0 to 30 mph speeds and commensurate for an ordinary passenger car on concrete and new asphalt. The aerodynamic drag coefficient for the vehicle is 0.36. In this configuration, each wheel station of the vehicle is fitted with the wheel motor assembly.

Figure 4:
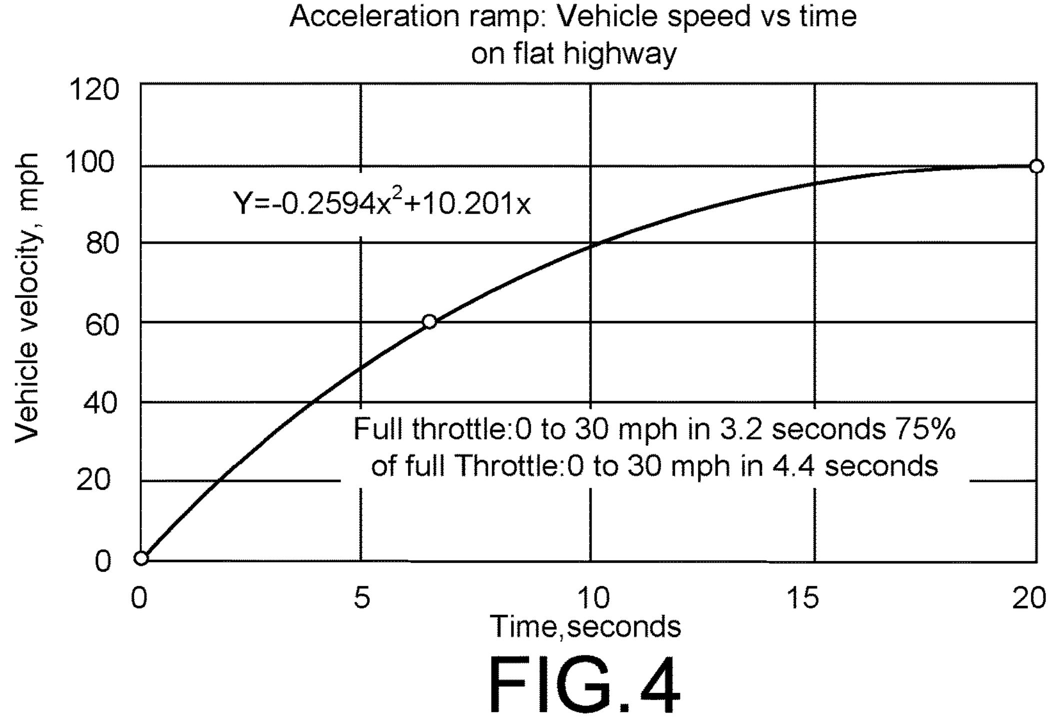
FIG. 4 is a graph of acceleration ramp of vehicle speed versus time.
Figure 5:
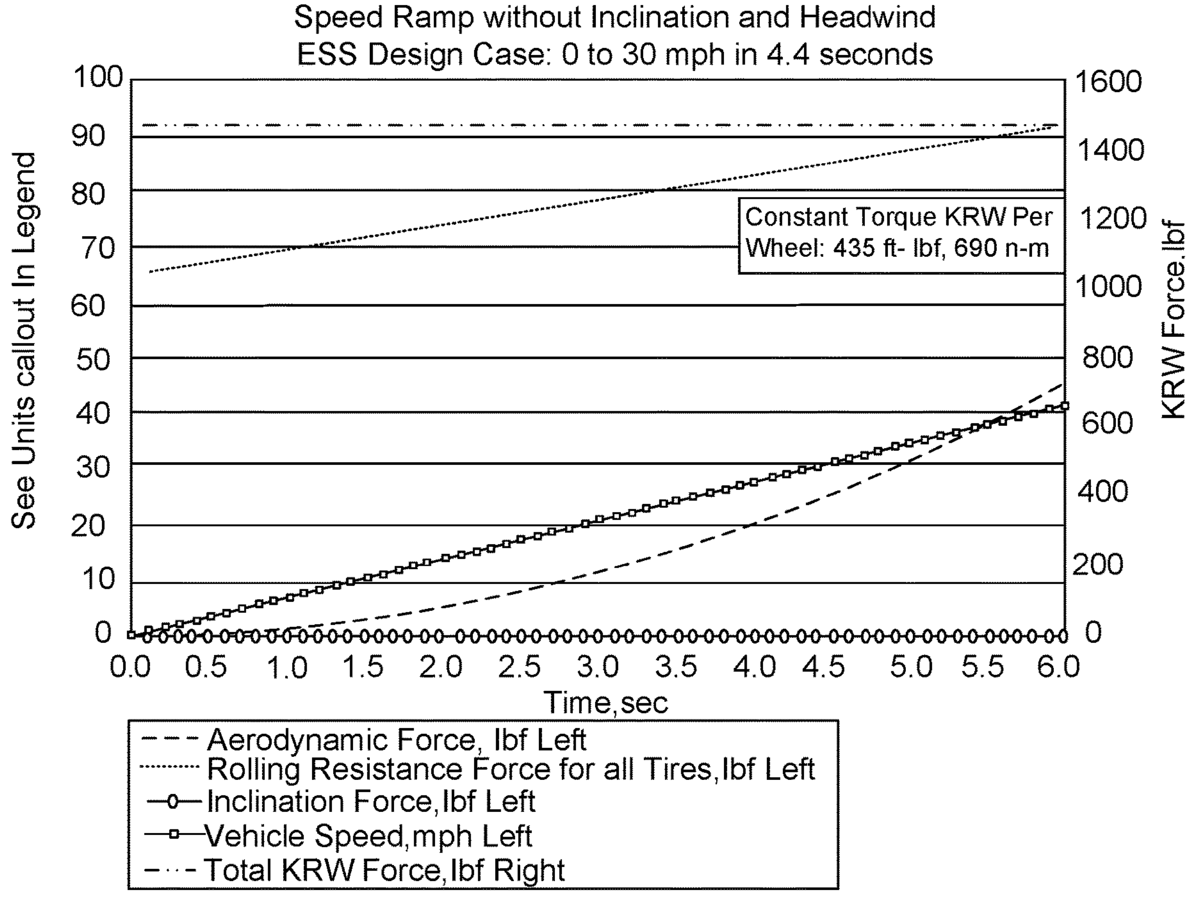
FIG. 5 is a graph of speed ramp without inclination and headwind.

Based upon current information, under full acceleration, the Ford Edge achieved 60 miles an hour at 6.8 seconds and ultimately can reach 100 mph at 20.0 seconds. Using a second order polynomial fit, a velocity versus time curve is produced in FIG. 4. For a more realistic driving pattern, the time-to-speed curve of FIG. 4 was reduced by 25%. The vehicle simulation model was then exercised. As shown in FIG. 5, a constant torque rating of 435 ft-lb (59 N-M) was needed to achieve a vehicle speed of 30 mph in 4.4 seconds. A velocity of 40 miles an hour is reached at 5.8 seconds.

Figure 6:
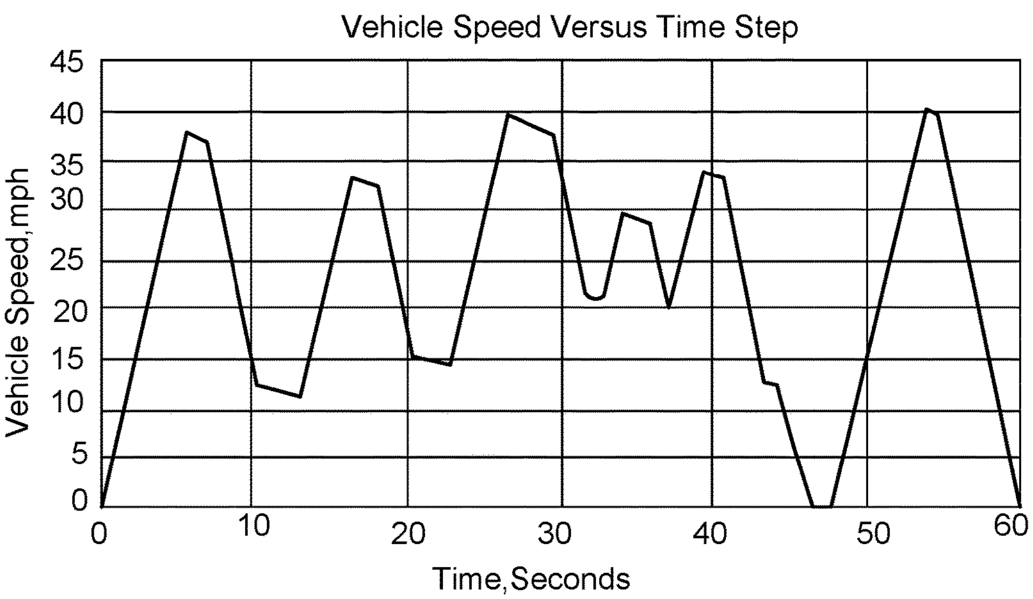
FIG. 6 is a graph showing vehicle speed versus time during arterial and local traffic congestion.

Based upon typical traffic patterns in arterial and local congested traffic patterns, a 60 second representation of vehicle speed versus time is illustrated in FIG. 6. This shows vehicle speed over a 60 second representative segment. The segment numerically replicates stop-and-go traffic with intermittent speeds ranging from 40 miles an hour to 0 mph. The vehicle simulation model was exercised over this traffic segment to determine the amount of stored energy needed for the wheel motor operation of the present invention. The amount of energy storage capacity (Wh) needed was determined by varying the capacity until the state of charge (SOC) range was maintained between the setpoints of 90% and 10%. This analysis determined that 120 Wh of stored energy capacity was required.

The following is a simulation showing the benefits of reduced fuel use and emissions with the wheel motor technology of the present invention as applied in congestive traffic. Specifically, the following TABLE 1 lists some of the key modeling parameters as follows:

TABLE 1

| Parameter Description | Value |
|---|---|
| Modeling Time Step | 100 ms |
| KRW's Torque Rating | 435 ft-lbf (590 nm) |
| Number of KRWs | All four wheel stations |
| Capacity of Capacitor ESS | 120 Wh, 30 Wh each |
| % Depth of Discharge for ESS | 80% |
| Maximum State of Charge | 90% |
| Minimum State of Charge | 10% |
| Added Vehicle Energy for Losses per Time Step, Initiated at Low SOC | 1.00 Wh at 40 mph and Linear with Speed Initiated at 50% SOC |
| Added Vehicle Energy for Losses per Time Step, Initiated at High SOC | 0.24 Wh at 40 mph and Linear with Speed Initiated at 70% |
| KRW One Way Efficiency | 90% |
| Vehicle Engine Efficiency | 30% |
| Vehicle Transmission/Drivetrain Efficiency | 70% |

As mentioned earlier, this analysis is a linear solution with a time step of 100 ms. For the selected vehicle (i.e. the 2019 Ford Edge), the wheel motor the present invention is torque-rated at 435 ft-lb (590 Mm) at all four wheels. Total capacity for the ESS is 120 Wh. Discharge is regulated between a SOC of 90% and 10%. The one-way efficiency of the wheel motor of the present invention is 90%. Vehicle engine and transmission efficiencies are 30% and 70%, respectively. The energy storage system of the present invention is charged by extracting vehicle kinetic energy through regenerative braking. Therefore, incremental inputs of vehicle energy are required to overcome parasitic losses and electrical losses. Vehicle energy input is commanded based on a two-step approach to maintain proper SOC control in the energy storage system.

Figure 7:
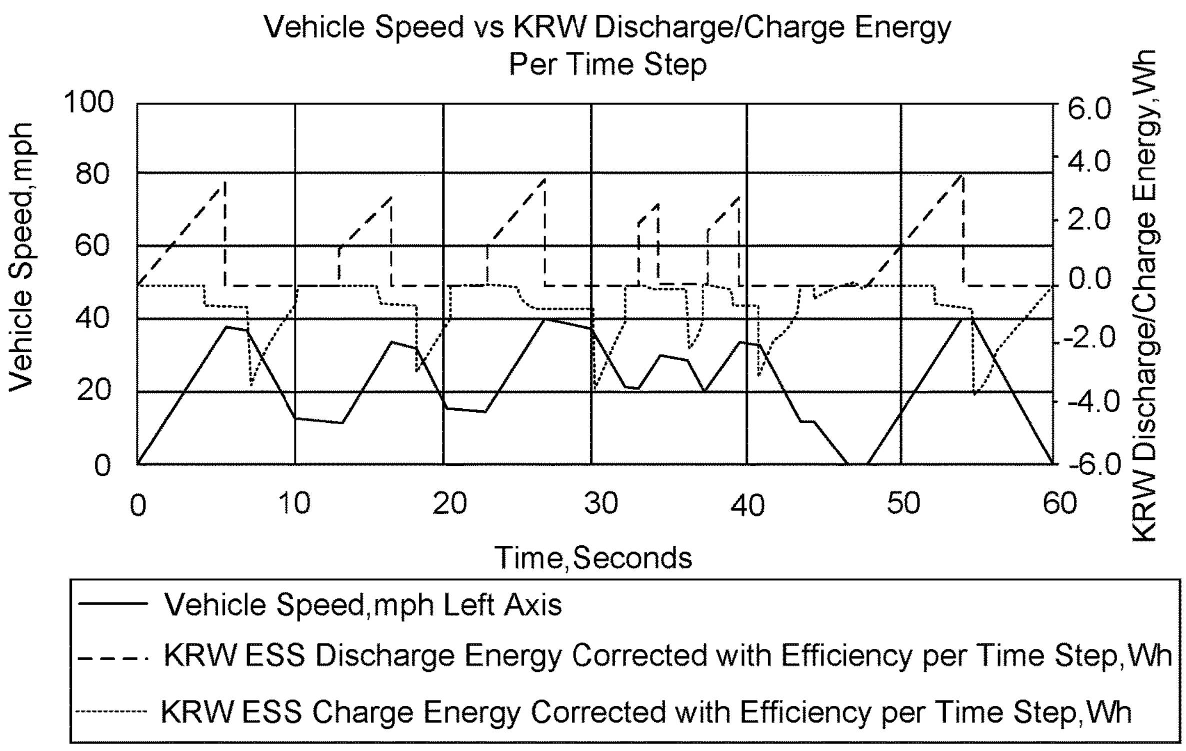
FIG. 7 is a graph of vehicles speed versus discharge/charge energy for losses.

The vehicle model was exercised over the 60 second, stop-and-go traffic segment discussed in association with FIG. 6 hereinabove. FIG. 7 shows the load-leveling action of the wheel motor of the present invention. For example, the wheel motor of the present invention applies positive wheel torque. This added energy is shown in FIG. 7 as a solid line. For decreased speed the wheel motor of the present invention applies negative torque. This negative or braking energy is shown as the dashed line in FIG. 7. During regenerative braking, the energy storage system is recharged.

Figure 8:
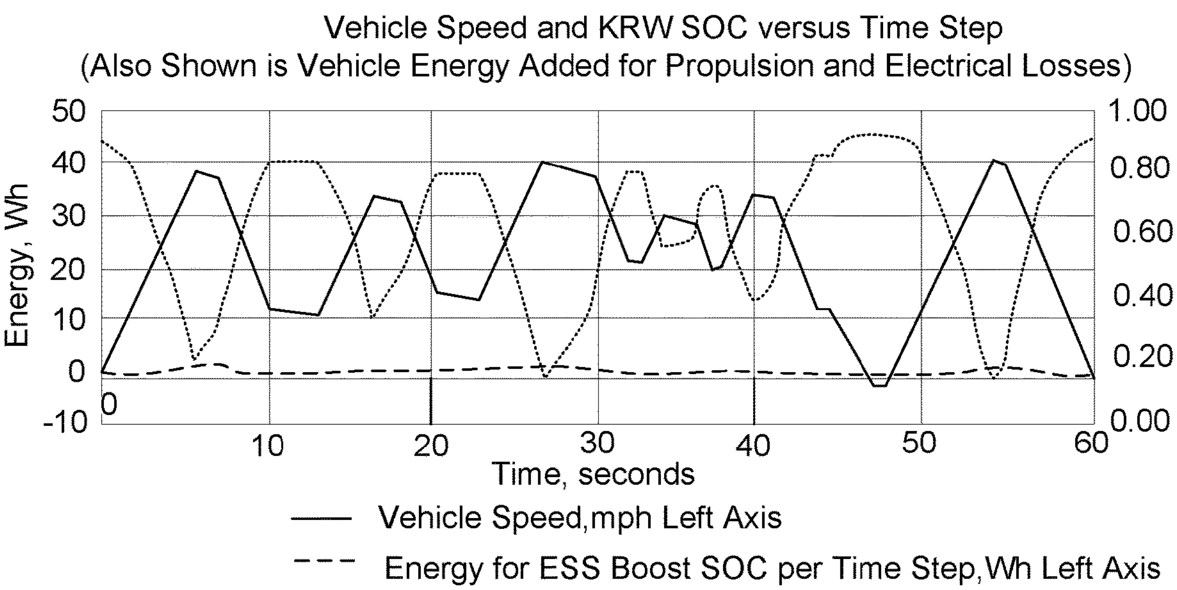
FIG. 8 is a graph showing vehicle speed versus the energy of the wheel motor over time.

FIG. 8 shows the changing SOC of the energy storage system as a result of vehicle acceleration and deceleration. The energy storage system is controlled between the SOC setpoints of 90% and 10%. The energy supplied by the engine to negate all losses per time step is also shown.

Losses include electrical losses for the wheel motor, aerodynamic losses, and tire rolling resistance losses.

Figure 9:
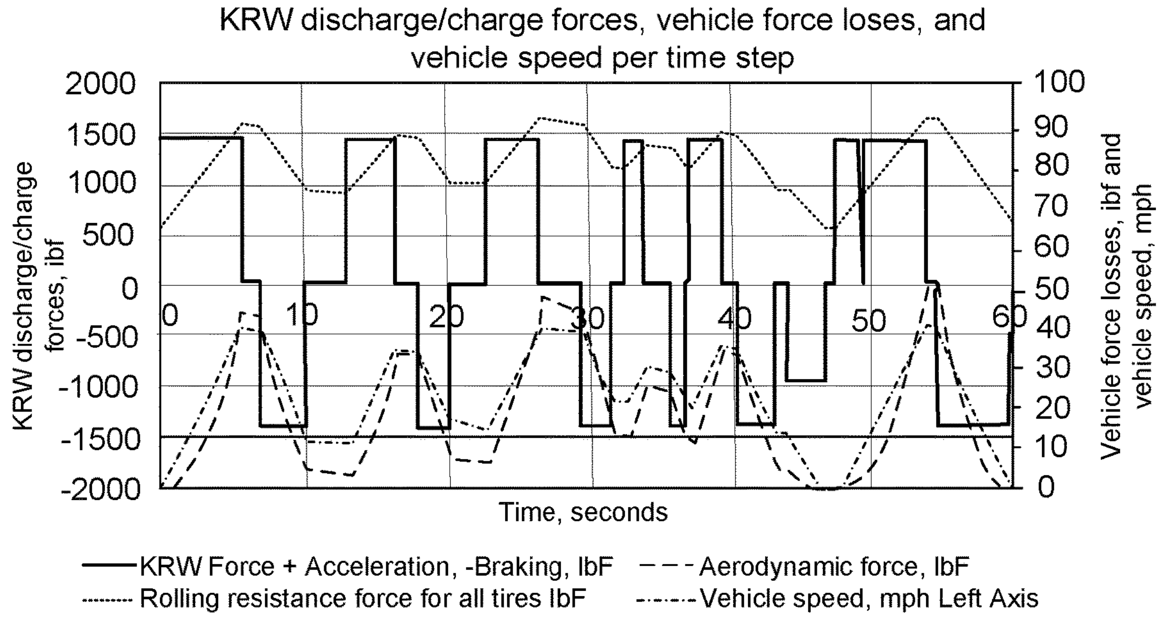
FIG. 9 is a graph of vehicle speed versus discharge/charge forces and vehicle force losses per time step.

FIG. 9 graphically shows the present individual parasitic losses per time step. The wheel motor of the present invention is a constant torque rating of 435 ft-lb. However, torque is varied to achieve the needed acceleration to match target velocities. As torque increases, its electrical losses also increase. Also, increased velocity results in increased aerodynamic and rolling resistance losses. Total energy losses over 60 seconds are in the order of approximately 170 Wh.

Using the parameters shown in TABLE 1, the model was exercised over a 30-minute segment of congested traffic replicated from the 60 second traffic data found in FIG. 7. By comparing values with and without the wheel motor of the present invention, fuel savings was determined. Total energy for vehicle propulsion without the wheel motors is 395 Wh. During regenerative braking, the wheel motor of the present invention recovers 314 Wh of energy. This value is not equal to the acceleration energy of 395 Wh since aerodynamic and tire rolling resistance losses are parasitic and not recoverable. Therefore, the energy required by the wheel motor of the present invention for vehicle propulsion is 170 Wh.

The stored energy of the wheel motor of the present invention is derived from recovery of the vehicle's kinetic energy. All calculations to convert energies is shown in the following TABLE 2 into gallons are subject to engine and driveline inefficiencies. Assuming efficiencies for the gasoline engine and transmission and driveline of 30% at 85%, respectively, operation with the wheel motors of the present invention reduces fuel use by 57%. Fuel reduction directly scales with emissions. Therefore, emissions are also reduced by 57%. This is shown below:

TABLE 2

| Vehicle Propulsion Energy with and without KRW | | |
|---|---|---|
| Vehicle propulsion energy needed without KRW | 385.3 Wh | 1.41 gallons |
| Vehicle propulsion energy supplied by KRW | 395.3 Wh | 1.41 gallons |
| Vehicle propulsion energy recovered by KRW | −313.7 Wh | −1.12 gallons |
| Net vehicle propulsion energy supplied by KRW | 81.8 Wh | 0.29 gallons |
| Total KRW electrical losses | 88.3 Wh | 0.31 gallons |
| Total KRW energy | 169.9 Wh | 0.61 gallons |
| Fuel and Emission Savings with KRW | | 57.0% |

The wheel motor of the present invention can operate in an independent mode with respect to the vehicle's controller. The wheel motor operates without any control commands to or from the vehicle. The operator accelerates and decelerates (i.e. brakes) in a normal fashion during stop-and-go traffic conditions. Based on the multi-axis acceleration measurements conducted on the wheel motor of the present invention, the wheel motor senses when the vehicle is accelerating or braking. Errors induced by hilly or uneven terrain are avoided using this multi-axis approach. Accelerometers integrated into the energy storage system can be applied in order to determine whether the vehicle is accelerating, decelerating and/or braking. When the accelerometer of the vehicle detects vehicle acceleration, positive torque is delivered by the wheel motor. The torque level is determined by acceleration level and the SOC of the wheel motor. The operator can cancel acceleration by tapping the brake pedal with enough force to cause slight vehicle deceleration. The accelerometer will sense such deceleration and then reset the wheel motor to either deliver propulsion or braking actions.

When the accelerometer of the wheel motor detects deceleration caused by an operator applying the conventional brakes, negative torque is applied to the vehicle. The torque level is determined by deceleration level and the SOC of the wheel motor. Slight engine throttle applied by the operator resulting in acceleration will cancel the braking action of the wheel motor. The wheel motor is then reset to deliver propulsion or braking actions. During deceleration, the energy storage system is recharged to the extent possible permitted by the available vehicle kinetic energy. Efficiency losses slowly consume the stored energy in the energy storage system. When the energy storage system is at a low SOC, the wheel motor gradually decreases its share of accelerating torque until it is recharged. The next time the operator has increased vehicle speed with the gas pedal and begins to slow the vehicle by braking, the wheel motor recovers its SOC by capturing the vehicle's kinetic energy. Likewise, if the energy storage is at high SOC, the wheel motor gradually decreases its share of braking torque. In all circumstances the operator is able to control vehicle speed with the brake pedal.

Vehicle parasitic and electrical efficiency losses also slowly consume the stored energy in the wheel motor. When the energy storage system is at a low SOC, the wheel motor gradually decreases its share of accelerating torque. The operator always can smoothly vary acceleration with the gas pedal. The wheel motor then uses the next braking action to recharge the energy storage system. Likewise, if the energy storage system is at a high SOC during braking, the wheel motor gradually decreases its share of braking torque until the actions of the wheel motor lower the SOC.

The wheel motor the present invention permits fuel savings and emissions reduction similar to that of electrical vehicles in which the wheel motor is retrofittable to fossil-fueled vehicles. Unlike the wheel motors available commercially today, the present invention integrates an energy storage system directly into the assembly. This offers the benefit of regenerative energy braking without the added cost of larger, more expensive batteries typically found on electrical vehicles.

Computer simulations were completed to determine fuel savings and emissions reductions for typical stop-and-go congested traffic. The retrofitting of a fossil-fueled vehicles with the wheel motors of the present invention can result in the 57% reduction in fuel use and emissions output for stop-and-go traffic up to 40 miles per hour. The technology can also provide acceleration boosts and energy recovery during deceleration at higher velocity driving cycles, such at 50 miles per hour to 65 mph or 60 miles an hour to 70 miles an hour. The retrofit with the technology of the present invention results in significant fuel savings and emissions reductions in typical stop-and having go traffic congestion.

The present invention utilizes a novel approach of adaptive switching between parallel and series circuit ordering of the capacitors and the DC-DC converted-based adaptive voltage control to optimize the wheel motor operation.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A wheel assembly for a vehicle comprising:

a rotor housing having a support structure, the rotor housing having permanent magnets therein, said rotor housing adapted to rotate relative to a rotation of the wheel;

a stator housing having windings therein, the windings of said stator housing and the permanent magnets of said rotor housing defining an air gap therein; and an energy storage module affixed to the support structure of said stator housing, said energy storage module being cooperative with the windings of said stator housing and with the permanent magnets of said rotor housing so as to receive and transmit energy from and to the windings relative to a motion of the vehicle, said energy storage module having a plurality of capacitor banks therein, the plurality of capacitor banks having switches therebetween, the plurality of capacitor banks comprising:

a first capacitor bank;

a second capacitor bank;

a first switch and a second switch extending in parallel between the first capacitor bank and the second capacitor bank;

a third capacitor bank;

a fourth capacitor bank;

a third switch and a fourth switch extending in parallel between the third capacitor bank and the fourth capacitor bank;

a fifth switch extending between the first capacitor bank and the third capacitor bank;

a sixth which extending between the second capacitor bank and the fourth capacitor bank;

a seventh switch extending between the first switch and the second switch;

an eighth switch extending between the third switch and the fourth switch; and a ninth switch extending between the fifth switch and the sixth switch.

2. The wheel assembly of claim 1, said energy storage module having a housing affixed to the support structure of said stator housing, the plurality of capacitor banks positioned in the housing of said energy storage module.

3. The wheel assembly of claim 1, the plurality of capacitor banks being switchably connected together such that at least some of the plurality of capacitor banks are in parallel as charge builds and voltage rises in the energy storage module.

4. The wheel assembly of claim 3, the plurality of capacitor banks being switchably connected together such that at least some of the plurality of capacitor banks are in series as charge is depleted and voltage drops in the energy storage module.

5. The wheel assembly of claim 1, further comprising:

wherein the first, second, third, fourth, fifth and sixth switches are closed and the seventh, eighth and ninth switches are open as the charge builds and the voltage rises.

6. The wheel assembly of claim 5, wherein the fifth switch and the sixth switch are open and the ninth switch is closed as charge starts to deplete and the voltage falls such that the second capacitor bank and the third capacitor bank are in series and the first capacitor bank and the fourth capacitor bank are in parallel.

7. The wheel assembly of claim 6, wherein the first, second, third and fourth switches are open and the seventh, eighth and ninth switches are closed such that the plurality of capacitor banks are in series as charge continues to deplete and the voltage continues to fall.

8. The wheel assembly of claim 1, further comprising:

control electronics affixed to the stator housing and connected to the energy storage module, said control electronics adapted to control the switches in the energy storage module.

9. The wheel assembly of claim 1, wherein each capacitor bank of the plurality of capacitor banks has a plurality of energy storage elements therein, the energy storage elements selected from the group consisting of capacitors, ultracapacitors, chemical batteries, solid-state batteries and combinations thereof.

10. The wheel assembly of claim 1, said energy storage module having at least one inverter therein, the at least one inverter adapted to switch the DC power from the plurality of capacitor banks into voltages for propulsion of the wheel motor.

11. The wheel assembly of claim 1, the air gap extending concentric to an axis of rotation of a wheel hub.

12. The wheel assembly of claim 1, said rotor housing adapted to be affixed to a non-rotatable portion of the vehicle.

* * * * *